United States Patent

[11] 3,553,500

[72] Inventor Finis C. Easter
 Canoga Park, Calif.
[21] Appl. No. 711,113
[22] Filed Mar. 6, 1968
[45] Patented Jan. 5, 1971
[73] Assignee RCA Corporation
 a corporation of Delaware

[54] MICROSENSING NETWORK
 6 Claims, 5 Drawing Figs.
[52] U.S. Cl................................................ 307/311,
 307/235, 328/2, 307/270, 330/22, 330/33
[51] Int. Cl............................................... H03k 3/42
[50] Field of Search.......................... 307/311,
 297, 296; 328

[56] References Cited
 UNITED STATES PATENTS
 2,947,875 8/1960 Beck .......................... 307/311
 3,073,969 1/1963 Skillen......................... 307/297
 3,397,317 8/1968 Dosch ......................... 307/297
 3,364,357 1/1968 Burwen........................ 307/311
 FOREIGN PATENTS
 896,087 5/1962 Great Britain................ 307/310

OTHER REFERENCES
" Wide Responsive Amplifier with Automatic Threshold Control" by Braun, IBM Technical Disclosure Bulletin Vol. 8 No. 4 Sept 1965 page 690 (copy 307/311)

*Primary Examiner*—Donald D. Forrer
*Assistant Examiner*—Harold A. Dixson
*Attorney*—H. Christoffersen ABSTRACT: Disclosed herein is an amplifier circuit arrangement for sensing very small currents (in the microampere region) whose accuracy is unaffected by variations of the input characteristics of the amplifying device. A current generating signal means is directly coupled to the input of the amplifying device, whose input parameters may vary with temperature and from unit-to-unit. A second current generating means, also directly coupled to the amplifying device input, is used to bias the input and to set a current threshold level which the current generating signal means must overcome, before the amplifying device can traverse from one region of operation to another. The use of current generating means with their high impedances renders the current threshold level insensitive to the variations of the amplifying device input.

PATENTED JAN 5 1971 3,553,500

INVENTOR
Finis C. Easter

BY H. Christoffersen
ATTORNEY

MICROSENSING NETWORK

BACKGROUND OF THE INVENTION

Current thresholding circuits are known for recognizing input currents which are either above or below a given nominal value. Prior art circuits generally take the form of an amplifying device, such as a transistor, which is switched between the conducting and nonconducting conditions or vice versa when the input current being sensed reaches the given nominal value (threshold). A disadvantage of known circuits of this type is that the threshold current varies with changes in the input characteristics of the transistor and/or with changes in the forward current gain (B).

It is an object of the present invention to provide an improved current thresholding circuit in which the threshold is insensitive to temperature changes and to variations in transistor characteristics.

BRIEF SUMMARY OF THE INVENTION

In arrangements embodying the invention, a current generating signal means, a current generating biasing means and amplifying or detecting device are used. The current generating signal means and the current generating biasing means are directly coupled to the amplifier's input. The current generating biasing means determines the current threshold level and maintains it virtually independent of the variations in the input characteristics of the amplifying device.

DETAILED DESCRIPTION

Figure 1:
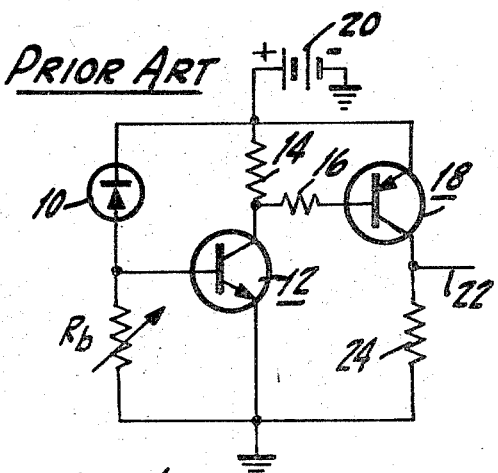
FIG. 1 is a schematic diagram of a prior art current sensing circuit.

The present invention addresses itself to the problem of accurately sensing low level current signals when the signal source is coupled into an amplifying or detecting device whose input characteristics vary. The task of sensing a predetermined current level is rendered difficult and sometimes impossible by the variations of the input characteristics of the detecting devices, for the parameter variations may be of equal amplitude to the magnitude of the signals to be detected. These variations mask the effect of the signal and give false input information resulting in an erroneous output.

Errors introduced at the input of the means used to detect or amplify the signal are crucial in two respects; (a) the signal is at its minimum and therefore any error signal has maximum effect at that point, and (b) it is impossible to differentiate between the "true" signal and the "false" signals introduced by parameter variations. The resulting signal, whether it be true or false, appears as an input to the amplifying device and will be multiplied by the gain of the amplifier, giving rise to erroneous output information. The problem is best illustrated by the prior art shown in FIG. 1 wherein the input characteristics of the amplifying device determine the threshold level.

The photodiode 10 is a transducer whose current output is proportional to the incident light intensity. The anode of the photodiode is directly coupled to the base of a common emitter stage transistor 12 which has a variable resistor $R_b$ connected between the base and the emitter. The collector of transistor 12 is connected to one end of resistors 14 and 16. The other end of resistor 14 is connected to a point common to the cathode of photodiode 10 and the emitter of transistor 18, said point being the positive terminal of potential source 20. The base of transistor 18 is connected to the other end of resistor 16. The collector of transistor 18 is connected to output terminal 22 and to one end of resistor 24. The other end of resistor 24 is connected to a point common to the emitter of transistor 12 and resistor $R_b$, said point being a point of reference potential or ground.

Photodiode 10 is a light-sensitive semiconductor device which produces a current proportional to the incident light intensity. This current is virtually independent of the applied potential and the load impedance. The P–N junction of photodiode 10 is reverse biased, the cathode being connected to a point of higher potential than the anode. In this mode, the photodiode has an extremely high impedance. The photodiode may therefore be classified as a current generator, in this case a signal responsive current generator.

When the threshold level is reached, current flows into the base of transistor 12. This results in a collector current, ($I_c$) which is equal to the product of the base current ($I_b$) and the forward current gain, ($B_1$), of transistor 12. The collector current of transistor 12 flows through two branches, one branch consisting of resistor 14 and the other branch consisting of resistor 16 and the base-to-emitter junction of transistor 18. The base current of transistor 18 is then multiplied by the forward current gain ($B_2$) of transistor 18, resulting in an output current flowing through the conduction path determined by the collector-to-emitter junction of transistor 18 and resistor 24.

Thus, current flowing into the base of transistor 12 results in an output current $I_o$, which is proportional to the produce of the base current and the forward current gain of transistors 12 and 18 ($I_o \cong B_1 B_2 I_b$). Since a typical value for the forward current gain of each transistor may be 50, the output current may be 2500 times the input base current. A current of 1 microampere flowing into the base of transistor 12 may result in 2500 microamperes flowing into resistor 24 which causes an output of 25 volts if resistance 24 is 10K ohms. Generally, such a large change constitutes a full output signal, being more than enough to saturate the output stage. This emphasizes the point made earlier that errors at the input must be minimized for it is these input signals that are multiplied by such a large factor.

The threshold level is the point at which current begins to flow into the base of transistor 12. This is reached when the photodiode supplies sufficient current to cause the potential drop across the base shunting resistor $R_b$ to be equal to the base-to-emitter forward junction threshold voltage $V_{BE}$ of transistor 12. Any additional photodiode current will cause current to flow into the base electrode. Thus, the criterion for base current to flow is that the photodiode signal current exceed the threshold current ($I_{TH}$) determined by the base-to-emitter forward junction voltage ($V_{BE}$) and $R_b$, i.e.

$$(I_{TH} = V_{BE/R_b}).$$

However, since $V_{BE}$ is temperature sensitive and varies by approximately 2 millivolts per degree C. in an average transistor, the threshold level will vary in direct proportion to the change in $V_{BE}$. It is impossible to distinguish between the effects of changes in $V_{BE}$ and signal current inputs. Therefore, where small currents are to be measured or detected, considerable error can result. Examining the operation of FIG. 1 at 25° C. and at 125° C. shows the resulting high degree of error. Assume for tutorial purposes: (1) that it is desired to operate the sensing circuit when the signal current equals or exceeds 10 microamperes (i.e., the threshold level is 10 microamperes); and (2) that transistor 12 is a silicon device with a $V_{BE}$ of 0.6 volt at 25° C. and 0.4 volt at 125° C. resulting from a negative temperature coefficient of 2 millivolts per degree C.

To meet the requirements of (1) and (2)) at 25° C. requires that $R_b$ be equal to 60K ohms. At 125° C., $V_{BE}$ has decreased to 0.4 volt, and the threshold level is therefore lowered to 6.67 microamperes for an error of 33 percent. This error is in direct proportion to the 33 percent change in $V_{BE}$. Thus, whereas at room temperature a photodiode current of at least 10 microamperes was necessary to produce a flow of current into the base of transistor 12, at 125° C. a 6.67 microampere photodiode current results in base current flow.

The present invention eliminates the dependence of threshold sensing on the $V_{BE}$ of the input stage and renders the threshold level temperature insensitive and additionally independent of component-to-component variation of the amplifying device input. The invention presents a novel design whereby the signal current into the amplifying device is rendered virtually independent of the input characteristics. Circuit arrangements embodying the invention use an equivalent current generating biasing means to set a threshold level and to bias the amplifying device used to sense the current level of a current generating signal means. The input electrode, e.g., base electrode, of the amplifying device therefore has two current generating means connected to it. One of the two current generating means has a polarity to induce conduction of the amplifying device while the other has polarity to inhibit conduction of the amplifying device. The effect is for one current generating means to pump or push current into the input node and for the other current generating means to draw or "sink" current away from the input node. The net current flowing into the amplifier input node is the difference between the two currents, with the direction of current flow being determined by the larger of the two currents.

The current generating signal means is a variable current generator whose output is dependent on some external phenomena. The signal means may be connected to the amplifier in a manner to either pump current into the amplifier input electrode or to draw current therefrom, the choice being based on the system function to be performed.

The current generating biasing means is an equivalent current generator which provides a substantially constant current threshold level. The bias means will either forward bias or reverse bias the amplifier input, its current polarity always being chosen opposite to the direction selected for the signal generator.

Thresholding occurs when the signal current equals the bias current. This condition may be attained in either or two ways: (a) by the signal current decreasing until the threshold level is reached, or (b) by the signal current increasing until the threshold level is reached. Furthermore, when the threshold level is reached the resulting "net signal current" may be used to either enhance or inhibit conduction of the amplifying device. But, regardless of the choice of operating mode, the threshold level must remain substantially constant.

Current generating means, as the term is used here and in the appended claims, whether used to supply current or to sink current, includes any transducer or combination of components whose circuit equivalent is a current generator whose current is substantially constant regardless of changes in the load impedance. An illustration of a current generating transducer is the photodiode whose current output is virtually independent of the applied potential or the load impedance. An illustration of a circuit combination used as a current generator, is a series branch comprising a source of applied potential (V) and a series resistance (R) which is selected to be much larger than the input impedance of the circuit it feeds. This combination is equivalent (by application of Norton's Theorem) to a current source whose amplitude is equal to the applied potential divided by the resistance (I = V/R) and a parallel impedance whose value equals the resistance (R). In the case of the ideal current generator, the parallel impedance is infinite. It is ideal because no current division can occur, a constant current is produced regardless of the load impedance and the current through the load remains constant for any load. The physically realizable current generators used in the preferred embodiments have a finite impedance in parallel with the equivalent current generator. But, if the load impedance is small compared with the equivalent impedance of the current generator, the load cure current will be essentially independent of the value of the load. The novel circuit may therefore be used in conjunction with a multiplicity of amplifying devices so long as the amplifiers input impedance is low. Two examples of classes of amplifiers with low input impedance are (1) a transistor grounded emitter stage, and (2) a transistor grounded base input stage.

Figure 2:
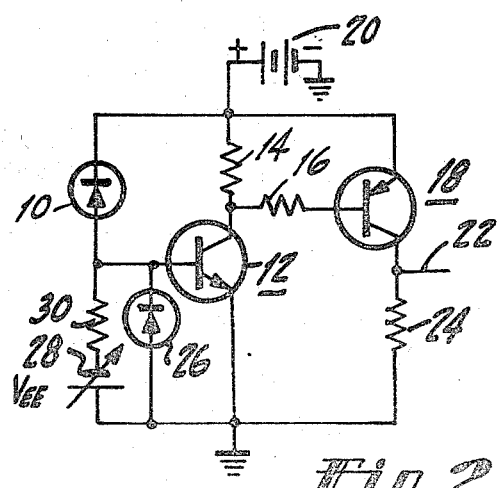
FIG. 2 is a schematic drawing of a sensing network embodying the invention in which a photodiode is used as the signal current generator.

The above-discussed concepts may be illustrated by FIG. 2 wherein photodiode 10, the current generating signal source, is connected to the amplifying device input; the base of transistor 12. Note that the current output of the photodiode is as described above for FIG. 1.

Shunting the base-to-emitter junction of transistor 12 are two branches; one consists of diode 26, the other comprises a potential source 28 of $V_{EE}$ volts and a resistor 30. Diode 26 prevents the reverse bias across transistor 12 from exceeding the forward voltage drop of diode 26. This keeps the reverse bias across the base-to-emitter region to less than 0.8 volt. In addition, diode 26 forms a conduction loop with $V_{EE}$ and resistor 21 when the photodiode current is less than the threshold current.

The threshold level as defined above is the point at which current begins to flow into the base of transistor 12. This is reached when the photodiode current produces a voltage drop across resistor 30 equal to the sum of $V_{EE}$ and the forward voltage drop the base-emitter ($V_{BE}$) junction of transistor 12. Signal current will flow into the base of transistor 12 when the photodiode current equals or exceeds the threshold current ($I_{TH}$) which is the value of current obtained by the addition of $V_{EE}$ and $V_{BE}$ divided by the value of resistor 30.

$$I_{TH} = \frac{V_{EE} + V_{BE}}{R_{30}}$$

An examination of the equation for the threshold current ($I_{TH}$) reveals that $V_{BE}$ is not the sole parameter determining $I_{TH}$. Moreover, if $V_{EE}$ is made at least 10 times larger than $V_{BE}$, the variations of $V_{BE}$ become insignificant in the determination of the threshold level. This is born out by analyzing the response of the novel circuit at 25° C. and at 125° C. and comparing the results to those obtained for FIG. 1.

For tutorial purposes assume, as above, that: (1) it is desired to operate the sensing network when the signal equals or exceeds 10 microamperes, and (2) transistor 12 is a silicon device with a $V_{BE}$ of 0.6 volt at 25° C. and 0.4 volt at 125° C. These requirements are met in practicing the invention by selecting the value of $R_{30}$ equal to 1 megohm and the value of the potential source 28 voltage $V_{EE}$ equal to 9.4 volts. At 125° C. $V_{BE}$ has changed to 0.4 volt and the threshold current has changed to 9.8 microamperes. This yields an error of 2 percent as compared to an error of 33 percent for FIG. 1.

It should be noted that the source of potential 28 and resistor 30 may be replaced (by application of Norton's Theorem) by a current generator of amplitude equal to the value of potential $V_{EE}$ divided by the value of resistor 30

$(I = V_{EE}/R_{30})$ shunted by a resistor of value equal to the resistance of resistor 30. The equivalent current generator is of a polarity to back bias the amplifying device input and inhibit the conduction path determined by photodiode 10 and transistor 12 until the threshold current is exceeded. The amplifying stage of FIG. 2 comprising the collector circuit of transistor 12, resistors 14, 16 and 24 and transistor 18 is a complementary transistor pair amplifier and operates as described for FIG. 1.

Note that diode 26 is not necessary to the invention. But, with diode 26 removed, the biasing network does not operate as a constant current generator over the whole range of signal current, though it still provides a constant current threshold level and in the thresholding region behaves exactly as described above.

Figure 3:
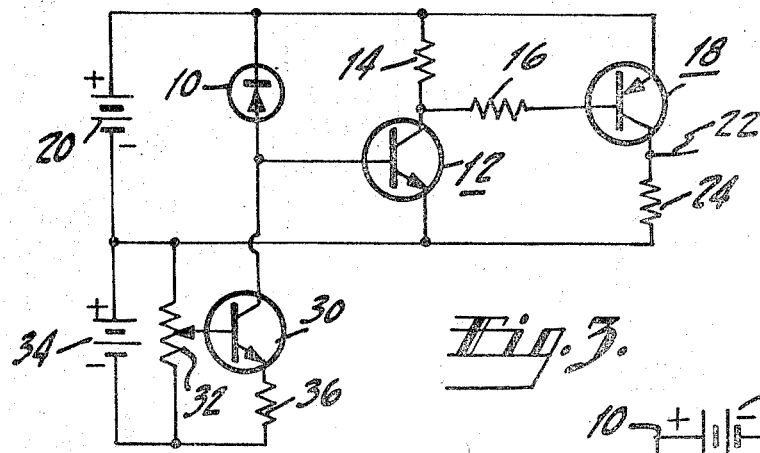
FIG. 3 is a schematic drawing of a sensing network embodying the invention, in which the current generating biasing means is a transistor used as a substantially constant current source.

FIG. 3 depicts another embodiment of the invention wherein the current generating biasing circuit means which is connected to the base electrode of the amplifying device (transistor 12) comprises a transistor 30 which is operated as a substantially constant current generator. The collector of transistor 30 is connected to the base of transistor 12, which is also common to the anode of photodiode 10. The base of transistor 30 is connected to a point of substantially fixed voltage by means of adjustable resistor 32, which is connected across the terminals of potential source 34. Resistor 36 is connected between the emitter of transistor 30 and the negative terminal of potential source 34. The voltage applied at the base of transistor 30 is of a polarity to forward bias the transistor and together with resistor 36 causes transistor 30 to operate as a substantially constant current device. Where the fixed voltage applied at the base of transistor 30 is much larger than the $V_{BE}$ drop of transistor 30 is large, the equivalent current gain of transistor 30 and where the minimum forward current gain of transistor 30 is large, the equivalent current generator operates as a substantially constant current device virtually independent of forward current gain (B) and $V_{BE}$ variations with temperature. In addition, any existing variations are in a direction to nullify the variations of transistor 12. The equivalent current generator presented by this combination requires more components than the circuit shown in FIG. 2, but it has a much higher source impedance, being several megohms at low collector currents which renders it more akin to the ideal current generator.

Except for the circuitry in the base of transistor 12, the remaining components of the amplifier circuit are the same as those illustrated in FIG. 1 and will not be described further.

Figure 4:
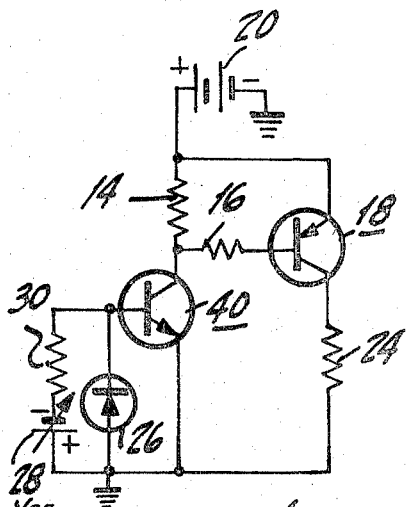
FIG. 4 is a schematic drawing of a sensing network embodying the invention in which the signal current generator is combined with the amplifying device.

Another arrangement embodying the invention is shown in FIG. 4, wherein transistor 40 is a phototransistor and combines the function performed by the photodiode 10 and transistor 12 shown in FIG. 2. The collector-to-base junction of transistor 40 is a photosensitive P–N junction which is back biased by the polarity of the applied potential. Incident light intensity causes conduction across the junction and a resultant current to flow into the circuit node at the base of transistor 40, which is thresholded as in the circuit of FIG. 2, previously described. Essentially, the collector-to-base junction may be represented as a signal responsive current generator fully equivalent to the photodiode 10 of FIG. 2. The current generating biasing means comprising the source of potential 28 and the resistor 30 sets the threshold current which the photosensitive signal current must exceed before any current can flow into the base electrode. When the photocurrent exceeds the reverse biasing current, the threshold is reached and the amplifier conducts. The remainder of the circuit is identical to the circuit shown in FIG. 1 and should need no further explanation.

Figure 5:
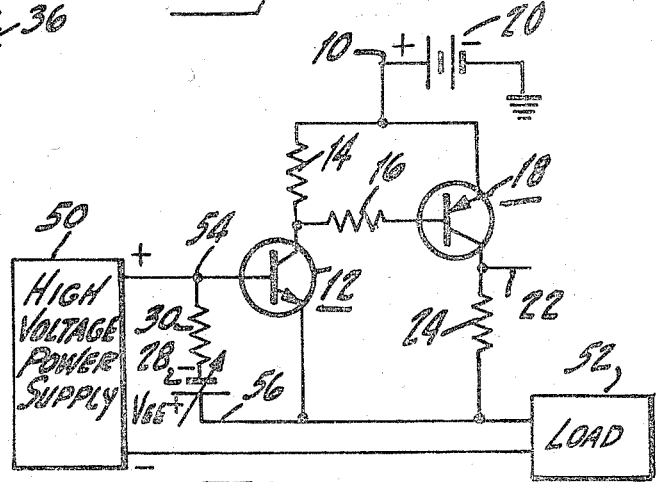
FIG. 5 is a schematic drawing of an arrangement embodying the invention and useful for sensing load current.

FIG. 5 shows an embodiment of the invention wherein the signal responsive current generating means consists of a high voltage power supply 50 and a load means 52. In this circuit the current flowing through the load is highly critical and any increase therein must be monitored to safeguard the system. A variation in the load means 52 tending to increase the current flow into the biasing circuit above the current threshold level set by potential source 28 and resistor 30 causes current to flow into transistor 12 producing an output at 22 indicative of the condition.

Although the circuits described show an NPN-type transistor as the input stage of the amplifying device, it will be apparent to those skilled in the art that the circuit will function with a PNP-type transistor provided that: (1) the connections to the potential source 20 are reversed; (2) the connections to the second source 28 of potential are reversed; and (3) the input signal source has a polarity to induce the flow of base current.

In addition, although the circuits described show the current generating biasing means in the base-to-emitter circuit with a polarity to reverse bias the amplifying device input stage, it will be apparent to those skilled in the art that the signal responsive current generating means may be connected in the base-to-emitter circuit with a polarity to reverse bias the amplifying device while the current generating biasing means is connected so as to forward bias the amplifying device.

I claim:

1. The combination comprising:
    an amplifying device having an input electrode;
    a first current generating means direct current coupled to said input electrode and generating a current of a first polarity relative to said input electrode;
    a second, signal responsive current generating means comprising a photodiode having an anode and a cathode, one of said anode and cathode being directly connected to a point of operating potential for reverse biasing the cathode with respect to the anode and the other one of said anode and cathode being directly connected to said input electrode and generating a current of a second polarity opposite to said first polarity;
    said first and second current generating means each having an equivalent circuit which reduces to a current generator whose current is substantially independent of variations in load impedance and of variations in sources of applied potential external to the current generating means; and
    said first current generating means generating a substantially constant threshold current which said second current generating means must overcome to change the direction of current flowing into said input electrode of said amplifying device.

2. The combination as claimed in claim 1, wherein said amplifying device is a transistor having a base electrode and an emitter electrode, one of said base electrode and emitter electrode being said input electrode and the other one of said base electrode and emitter electrode being connected to a point of reference potential and wherein said first current generating means includes a resistor in series with a voltage source, said voltage source supplying a voltage of much greater amplitude than the base-to-emitter junction voltage of said transistor, and the value of said resistor being much greater than the base input impedance of said transistor.

3. The combination as claimed in claim 1, wherein said amplifying device is a transistor having a base electrode and an emitter electrode, one of said base electrode and emitter electrode being said input electrode and the other one of said base electrode and emitter electrode being connected to a point of reference potential; and
    wherein said first current generating means includes a resistor and a second transistor having a base, a collector and an emitter;
    means connecting said collector to the input electrode of the amplifying device;
    means connecting the base of said second transistor to a point of substantially fixed potential; and
    means connecting said emitter of said second transistor to one end of said resistor, the other end of said resistor being connected to a point of operating potential having a value to forward bias the base-to-emitter junction of said second transistor.

4. The combination comprising:
    an input node;
    a phototransistor having base, emitter and collector electrodes; means direct current connecting the base to said input node, the emitter to a point of reference potential and the collector to a source of operating potential poled in a direction to reverse-bias the collector-to-base junction; said base-to-collector junction being photosensitive and operating as a first signal responsive current generating means generating a current of a first polarity into said input node as a function of incident light intensity;
    a second current generating means direct current connected to said input node and generating a current of a second polarity opposite to said first polarity; and
    said second current means generating a substantially constant threshold current which said first current means must overcome to change the direction of current flowing into said input node and said phototransistor amplifying the current differential generated by a said first and second current means.

5. The combination as claimed in claim 4, wherein said second current generating means includes a resistor in series with a voltage source, said voltage source supplying a voltage of much greater amplitude than the base-to-emitter junction voltage of said phototransistor, and the value of said resistor being much greater than the base input impedance of said transistor.

6. The combination as claimed in claim 4, wherein said second current generating means includes a resistor and a second transistor having a base, a collector and an emitter; wherein the collector of said second transistor is connected to the base of said phototransistor, the base of said second transistor is connected to a point of fixed potential; and further providing means connecting the emitter of said second transistor to one end of said resistor, the other end of said resistor being connected to a point of operating potential having a value to forward bias the base-to-emitter junction of said second transistor.